United States Patent Office 3,748,145
Patented July 24, 1973

3,748,145
BICYCLIC PYRAZINE COMPOSITIONS FOR FLAVORING PROCESSES
Alan O. Pittet, Atlantic Highlands, Michael E. Mason, Fair Haven, Ernst T. Theimer, Rumson, and Merrick S. Tibbetts, Colts Neck, N.J., assignors to International Flavors & Fragrances Inc., New York, N.Y.
No Drawing. Original application Apr. 14, 1970, Ser. No. 28,528, now Patent No. 3,686,177. Divided and this application Sept. 9, 1971, Ser. No. 179,162
Int. Cl. A23l 1/26; C07d 51/76
U.S. Cl. 99—140 R                    6 Claims

ABSTRACT OF THE DISCLOSURE

Processes for altering the flavors of consumable products, including foodstuffs and tobaccos, which comprise adding thereto a small but effective amount of at least one bicyclic pyrazine having the formula

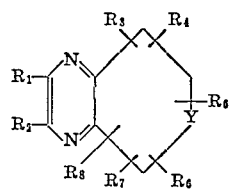

wherein Y is ($-CH_2-$)$_n$, $n$ is an integer from 1 to 5, and $R_1$, $R_2$, $R_3$, $R_4$, $R_5$, $R_6$, $R_7$, and $R_8$ are the same or different and represent hydrogen, or alkyl; the products so produced; flavoring and flavor-enhancing compositions containing such bicyclic pyrazines; and novel bicyclic pyrazines and processes for their production.

This application is a division of our parent application Ser. No. 28,528 filed on Apr. 14, 1970, now Pat. No. 3,686,177.

BACKGROUND OF THE INVENTION

The present invention relates to bicyclic pyrazines and their use in processes and compositions for altering the flavors of various materials such as tobaccos, foodstuffs, and the like, as well as such novel pyrazines and processes for producing them.

Because of the tremendous consumption of foods, tobaccos, and other materials, there has been an increasing interest in substances and methods for imparting flavors to such consumable materials. This interest has been stimulated not only because of the inadequate quantity of natural flavoring materials available, but perhaps even more importantly, because of the need for materials which can combine several nuances, will be more stable than natural materials, will blend better with other flavors or flavoring compositions components, and will generally provide superior products.

There have recently been suggestions that certain pyrazine derivatives have flavors which might be useful in foods and other consumable materials. For example, tetramethylpyrazine has been suggested for use with vanillin in chocolate flavors, acetylpyrazine has been used in tobacco and foods, and methoxypyrazine has been said to impart a nut-like flavor to foods. Pyrazino[b]cyclopentanes have also been suggested.

THE INVENTION

It has now been found that heretofore unknown bicyclic pyrazines are capable of imparting a wide variety of flavors to various consumable materials. Briefly, the invention contemplates altering the flavors of such consumable materials by adding thereto a small but effective amount of at least one bicyclic pyrazine having the formula

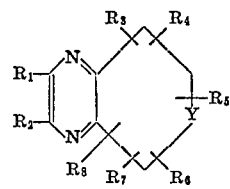

wherein Y is ($-CH_2-$)$_n$; $n$ is an integer from 1 to 5, inclusive; and $R_1$, $R_2$, $R_3$, $R_4$, $R_5$, $R_6$, $R_7$, and $R_8$ represent hydrogen or alkyl and are the same or different. The invention also contemplates flavoring and flavor-enhancing compositions containing such bicyclic pyrazines, as well as the novel pyrazines and the processes for preparing them.

More specifically, the bicyclic pyrazines according to this invention are pyrazines to the "b" side of which is fused a six- to ten-membered hydrocarbon ring. Such ring can be substituted with one or more alkyl groups, and the pyrazine ring can also be substituted with one or two alkyl groups. In some instances one or the other of the rings can be substituted with an alkadienyl group. It will be appreciated from the present disclosure by those skilled in the art that one or more pairs of the alkyl groups substituent on the hydrocarbon ring can be geminal, i.e., can be attached to the same ring carbon atom. It is generally preferred in practicing the present invention that the substituents be hydrogen or a lower alkyl group, particularly one having from one to three carbon atoms.

A particularly preferred bicyclic pyrazine for use herein is 5,6,7,8-tetrahydroquinoxaline having the formula

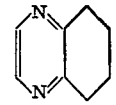

This clear to yellowish liquid has nut-like strong cereal, fried corn-like odor and flavor characteristics, as further described hereinafter.

The lower alkyl derivatives of this material have interesting flavor and odor character and include 5-methyl-5,6,7,8-tetrahydroquinoxaline,
2-ethyl-5,6,7,8-tetrahydroquinoxaline,
2-methyl-7-propyl-5,6,7,8-tetrahydroquinoxaline,
5,6-diethyl-5,6,7,8-tetrahydroquinoxaline,
5,7-dimethyl-5,6,7,8-tetrahydroquinoxaline, and the like. Thus, for example, 2,3-dimethyl-5,6,7,8-tetrahydroquinoxaline is obtained according to the present invention as a colorless crystalline material having a tobacco-honey aroma. 5,7,7-trimethyl-5,6,7,8-tetrahydroquinoxaline is a liquid having a pleasant honey, tobacco flavor, while pyrazino[b]cyclodecane is a yellowish liquid having a peanut and cracker-like flavor character.

The novel bicyclic pyrazines prepared according to the present invention can be obtained by a number of reaction routes, as by reacting 1,2-diaminocyclohexane or monoalkyl- or polyalkyl-substituted 1,2-diaminocyclohexane with glyoxal (a "dioxoalkane") or 1-alkyl or 1,2-dialkyl derivatives thereof, e.g., 2,3-butandione, under ring-closing conditions, or by reacting a 2-halocyclohexanone with ethylene diamine (a vicinal diaminoalkane) or a 1-alkyl or 1,2-dialkyl derivative thereof, e.g., 2,3-diaminobutane, or by reacting an aliphatic ethylenediamine or an alkyl or 1,2-dialkyl derivative thereof with a 1,2-cyclohexadione or a mono- or polyalkyl derivative thereof. The bicyclic hydropyrazine compounds obtained upon ring-closure are then dehydrogenated as necessary to provide the fused pyrazine ring.

Analogous compounds containing seven- to ten-membered rings fused to the pyrazine ring are prepared similarly utilizing 1,2-diaminocycloheptane or mono- or polyalkyl derivatives thereof instead of the diaminocyclohexanes with the dioxoalkane, or utilizing 2-halocycloheptanone or its monoalkyl or polyalkyl derivatives with ethylene diamine or its derivatives instead of 1,2-diaminocyclohexane, or utilizing 1,2-cycloalkadione or mono- or polyalkyl derivatives thereof with ethylene diamine or its derivatives instead of cyclohexadione. Thus, for example, either (1) a 1,2-diaminocyclohexane or -cycloheptane and the dioxo compound or (2) a 2-halo-cyclohexanone or -cycloheptanone and a vicinal diaminoalkane are admixed preferably below 10° C. to form respectively, in case (1) above the dihydropyrazino[b]cyclohexane or, the dihydropyrazino[b]cycloheptane and in case (2) above, the tetrahydropyrazino[b]cyclohexane and the tetrahydropyrazino[b]cycloheptane and double bond isomers thereof.

Examples of the 1,2-diaminocyclohexanes and 1,2-diaminocycloalkanes are:

1,2-diaminocyclohexane;
1,2-diamino-4,5-dimethylcyclohexane;
1,2-diamino-3,3,5,5-tetramethylcyclohexane;
1,2-diamino-3,4,4-triethylcyclohexane;
1,2-diamino-3,3-dimethyl-4,4-diethylcyclohexane;
1,2-diaminocycloheptane;
1,2-diamino-5-methylcycloheptane;
1,2-diamino-3,3,5,5-tetramethylcyclohexane;
1,2-diamino-3,3-dimethyl-5,5-diethylcycloheptane; and
1,2-diamino-3,7-dimethylcyclodecane, Examples of the 2-halo-cyclohexanones and 1,2-cycloalkadiones are 2-chlorocyclohexanone;
2-bromocyclohexanone;
2-chloro-3,4-dimethylcyclohexanone;
2-chloro-3,3,5,5-tetramethylcyclohexanone;
2-bromocycloheptanone;
2-bromo-3,4,5-triethylcycloheptanone;
2-bromo-3,4,5,6-tetramethylcycloheptanone; and
2-chloro-5-methylcyclodecanone.

Examples of the 1,2-cycloalkadiones capable of being utilized herein are:

1,2-cyclodecadione;
4,4-dimethyl-1,2-cyclodecadione;
3,7-diethyl-1,2-cyclononadione;
3,4,5-trimethyl-7-ethyl-1,2-cyclononadione;
1,2-cyclononadione;
1,2-cyclooctadione;
3-methyl-1,2-cyclohexadione;
4-methyl-1,2-cycloheptadione; and
1,2-cycloheptadione.

In reactions involving dioxoalkanes or halocycloalkanones, the temperature of the reaction is desirably below −10° C. to prevent decomposition of the dihydropyrazine to unwanted by-products. Temperatures below −80° C. are not necessary and can require excessive time for completion of the reaction. It is accordingly desirable to use temperatures from about −80° to 10° C. and it is preferred to utilize temperatures of from about −30° C. to −15° C. For reactions involving 1,2-cycloalkadiones, vehicle reflux temperatures are utilized.

After the formation of the dihydropyrazine bicyclic compound, it is oxidized to provide the corresponding pyrazine derivative. This is carried out at an alkaline pH obtained by adding a strong alkali metal hydroxide or an equivalent material such as an alkali metal carbonate. The hydroxides of sodium or potassium are desirably used.

The hydroxide-containing mixture is then treated with oxygen at a temperature of from 20° to 50° C. to provide a satisfactory reaction rate while minimizing undesirable side reactions and the ebullition of the reactants. The oxygen can be pure or can contain inert diluents. Air can be used as the oxygen source.

The oxygen is added to the reactants by sparging or otherwise bubbling the gas through the reaction mixture. At the temperatures used herein, the times for the reaction range from about 30 minutes to 24 hours, and it is desirable to carry out the reaction such that it attains a high degree of completion in from about one to three hours.

The reaction is desirably carried out in an inert reaction vehicle to reduce polymer formation, to permit better control over the reaction temperature, and to improve mixing of the reactants. The preferred inert reaction vehicles are solvents and include alkanols, preferably lower alkanols such as methanol, ethanol and the like.

After the reaction is completed, as readily determined by gas chromatography, the pH of the reaction mixture can, if desired, be reduced by the addition of an acid, desirably a strong mineral acid such as dilute sulfuric acid, preferably 10% to 50% sulfuric acid. If any undissolved hydroxide exists at this point then it is preferred that it be removed, as by centrifugation or filtration. The crude bicyclic pyrazine is then stripped of vehicle and further purified as desired according to the procedures hereinafter described.

The ratio of diaminocycloalkane to the glyoxal or of cycloalkadione to diaminoalkane can be stoichiometric, but better yields are frequently obtained with amounts of glyoxal or diaminoalkane in up to 10% excess of stoichiometric. It will be appreciated by those skilled in the art that use of 1,2-diamino-3-ethylcyclohexane with glyoxal will provide 5-ethyl-5,6,7,8-tetrahydroquinoxaline and reaction of 1,2-diaminocyclohexane with diacetyl will provide 2,3-dimethyl - 5,6,7,8 - tetrahydroquinoxaline, and so on.

The tetrahydroquinoxaline according to the present invention can also be prepared by oxidation and subsequent acidification of 1,2,3,4-tetrahydrophenazine to form tetrahydroquinoxaline dicarboxylic acid or the alkali metal salt thereof and pyrolysis of the acid or salt to the quinoxaline.

The initial oxidation reaction is carried out with a strong oxidizing agent such as aqueous alkali metal permanganate, desirably potassium permanganate. In order to obtain good yields without unduly long reaction times, the reaction is desirably carried out at temperatures of at least about 75° C. In aqueous solution at atmospheric pressure this reaction can be carried out at temperatures of about 100° C., although higher temperatures are possible at superatmospheric pressures. The desirable temperature range for use herein is accordingly from about 75° C. to 100° C., and temperatures from 80° C. to 95° C. are preferred.

After ring cleavage with the oxidizing agents, the manganese dioxide precipitate obtained is filtered, centrifuged, or otherwise removed from the aqueous solution (which aqueous solution contains substantially all of the product of reaction) and washed several times with water to recover all traces of the product which has the structure:

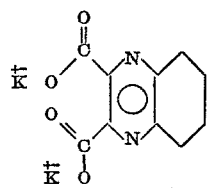

The dicarboxylate-containing solution is then acidified with an acid, desirably a strong mineral acid such as sulfuric, hydrochloric, and the like, to precipitate the dicarboxylic acid. Hydrochloric acid is a preferred mineral acid. The acidified material is then concentrated to remove water.

The dicarboxylic acid is recovered by filtration and pyrolyzed at from 180° to 300° C. to provide the pyrazine. The pyrolysis is discontinued when the reaction is completed, as evidenced by cessation of $CO_2$ evolution.

It will be understood by those skilled in the art that the intermediate and the final products prepared herein are neutralized, washed, and dried to obtain the desired substances. The novel bicyclic pyrazines can be obtained in purer form or in substantially pure form by conventional purification techniques. Thus, the products can be purified and/or isolated by distillation, extraction, crystallization, preparative chromatographic techniques, and the like. It has been found desirable to purify the bicyclic pyrazines by fractional distillation under vacuum.

It will be appreciated from the present disclosure that the bicyclic pyrazines and mixtures thereof according to the present invention can be used to alter, vary, fortify, modify, enhance, or otherwise improve the flavor of a wide variety of materials which are ingested, consumed, or otherwise organoleptically sensed. Such pyrazines are accordingly useful in flavoring compositions and in flavor-enhancing compositions. A flavor-enhancing composition is taken to mean one which contributes a part of the overall flavor impression by supplementing or fortifying a natural or artificial flavor in a material.

When the bicyclic pyrazines of this invention are used in a flavoring or a flavor-enhancing composition, they can be combined with conventional flavoring materials including organic acids such as fatty, saturated, unsaturated, and amino acids; alcohols, including primary and secondary alcohols; esters; carbonyl compounds including ketones and aldehydes; lactones; other cyclic organic materials including benzene derivatives, alicyclics, heterocyclics such as furans, pyridines, other pyrazines and the like; sulfur-containing materials including thiols, sulfides, disulfides and the like; proteins; lipids; carbohydrates; so-called flavor potentiators such as monosodium glutamate, guanylates, and inosinates; natural flavoring materials such as cocoa, vanilla, and caramel; artificial flavoring materials such as vanillin; and the like.

It will be appreciated from the present description that the types and amounts of materials selected from the foregoing groups of materials will depend upon the precise organoleptic character desired in the finished product and, especially in the case of flavoring compositions used to enhance other flavors, will vary according to the foodstuff to which flavor and aroma are to be imparted. Inorganic materials such as sodium chloride and freshness preservers such as butylated hydroxyanisole and propyl gallate can be added for their adjuvant or preservative effects on the flavoring composition.

The bicyclic pyrazines, or the compositions incorporating them, as mentioned above, can be combined with one or more vehicles or carriers for adding them to the particular product. Vehicles can be edible or otherwise suitable materials such as ethyl alcohol, propylene glycol, water, and the like. Carriers include materials such as gum arabic, carrageenen, other gums, and the like. The pyrazines can be incorporated with the carriers by conventional means such as spray-drying, drum-drying, and the like. Such carriers can also include materials for coacervating the pyrazines (and other flavoring ingredients, as present) to provide encapsulated products. When the carrier is an emulsion, the flavoring composition can also contain emulsifiers such as mono- and di-glycerides of fatty acids and the like. With these carriers or vehicles the desired physical form of the composition can be prepared.

It will be understood by those skilled in the art that the bicyclic pyrazines can be added to the materials to be flavored at any convenient point in the production of the finished product. Thus, when the bicyclic pyrazines are used to alter or otherwise vary the flavor of a foodstuff, they can be added in the original mixture, dough, emulsion, batter, or the like prior to any cooking or heating operation. Alternatively, they can be added at a later stage of processing if volatilization losses would be excessive during the earlier processing.

When the materials are used to treat tobacco products, for example, the additive can be applied in a suitable manner by spraying, dipping, or otherwise. The pyrazines can be applied during the "casing" or final spray treatment of the tobacco, or they can be applied at some earlier stage of curing. The quantity of bicyclic pyrazines or mixtures thereof utilized should be sufficient to impart the desired flavor characteristic to the product, but on the other hand, the use of an excessive amount of the pyrazines is not only wasteful and uneconomical but in some instances too large a quantity may unbalance the flavor or other organoleptic property of the product to be consumed. The quantity used will vary depending upon the ultimate foodstuff, tobacco product, or other consumable product; the amount and type of flavor initially present in the product; the further process or treatment steps to which the product will be subjected; regional and other preference factors; the type of storage, if any, to which the product will be subjected; and the pre-consumption treatment, such as baking, frying, and so on, given to the product by the ultimate consumer.

It is accordingly preferred that the ultimate compositions contain from about 0.1 part per million (p.p.m.) to about 100 p.p.m. of bicyclic pyrazines. More particularly, in food compositions it is desirable to use from about 0.1 to about 20 p.p.m. and in certain preferred embodiments of the invention, from about 1 to about 15 p.p.m. of the pyrazines are included in the finished product. On the other hand, tobacco compositions can contain as little as 0.1 p.p.m. and as much as 100 p.p.m., depending upon whether a cigarette tobacco, a pipe tobacco, a cigar tobacco, a chewing tobacco, or snuff is being prepared. All parts, proportions, percentages, and ratios herein ore by weight unless otherwise indicated.

The amount of bicyclic pyrazine or pyrazines to be utilized in flavoring or flavor-enhancing compositions can be varied over a wide range depending upon a particular quality to be added to the foodstuff, tobacco, or other consumable material. Thus, amounts of one or more bicyclic pyrazines according to the present invention from about 0.1 up to 80 or 90% can be incorporated in such compositions. It is generally found to be desirable to include from about 0.5 to about 25% of the bicyclic pyrazines in such compositions.

The following examples are given to illustrate embodiments of the invention as it is presently preferred to practice it. It will be understood that these examples are illustrative, and the invention is not to be considered as restricted thereto except as indicated in the appended claims.

EXAMPLE I

Preparation of 5,6,7,8-tetrahydroquinoxaline

A five-liter Morton flask equipped with an agitator, thermometer, reflux condenser, addition funnel, and gas sparging tube is charged with a solution of 114.2 g. (1.0 mole) of 1,2-diaminocyclohexane in 2700 ml. of ethanol. The flask contents are cooled to −20° C., and 159.8 g. (1.1 mole) of 40% aqueous glyoxal is added during ten minutes. About 2–3 minutes after the addition is complete, the reaction mixture assumes a milky, heterogeneous appearance.

The mixture is then stirred for two hours at −20° C., whereafter 40 g. of potassium hydroxide pellets are added. Oxygen is passed through the hydroxide-containing mixture for one hour at −20° C., and the temperature is then raised to 40–50° C. after which oxygen is passed through for an additional hour. During the higher temperature portion of the oxygen addition the color of the reaction mass changes successively from milky through clear yellow to orange-yellow to darker orange-brown.

The vehicle is recovered in a Buchi evaporator. The brown residue from the evaporator is flash-distilled at 75–88° C. and 4.0–2.0 mm. Hg to obtain a yellow liquid. The 50.2 g. of product in 3000 ml. of hexane is then fed to a chromatography column loaded with 1000 g. of 80–200 mesh acidified alumina. The column is then successively eluted with 3000 ml. of 25% ether-75% hexane, and with 2000 ml. of 40% ether-60% hexane to obtain a total of 30.0 g. of 5,6,7,8-tetrahydroquinoxaline product.

Proton magnetic resonance (PMR) analysis of the product in carbon tetrachloride shows a broad singlet at 1.92 p.p.m. (four protons on a cyclohexane ring in the beta position from a pyrazine ring), a broad singlet at 2.90 p.p.m. four protons on a cyclohexane ring alpha to a pyrazine ring, and a singlet at 8.38 p.p.m. attributable to two protons on a pyrazine ring. Infrared (IR) analysis shows absorptions at 3014, 1405, 1154, 1175, 990, 930, 905, 855, and 830 cm.$^{-1}$. Ultraviolet (UV) spectral analysis shows absorptions at 210, 274, and 285 nm.

Mass spectroscopy of the material at an inlet temperature of 150° C. magnet current of 380 ma., ionizing current of 5 $\mu$a., and a 70-volt ionizing potential shows:

| Mass/charge | Net peak height | Relative intensity, percent |
| --- | --- | --- |
| 26 | 118 | 18.5 |
| 27 | 157 | 24.6 |
| 39 | 169 | 24.5 |
| 41 | 132 | 20.7 |
| 51 | 114 | 17.9 |
| 52 | 207 | 32.5 |
| 79 | 110 | 17.3 |
| 106 | 179 | 28.1 |
| 119 | 123 | 19.3 |
| 133 | 338 | 53.1 |
| 134 | 637 | 100.0 |

EXAMPLE II

Preparation of 5,6,7,8-tetrahydroquinoxaline

A three-necked flask fitted with condenser, mechanical agitator, thermometer, and dropping funnel is charged with 6.0 g. of 1,2,3,4-tetrahydrophenazine in 125 ml. of water and heated to 90° C., and a solution of 37.0 g. of potassium permanganate in 100 ml. of water is added during an hour while the temperature is maintained at 80–90° C. The flask contents are stirred for an additional one-half hour, cooled to 70–75° C., and filtered.

The residue is slurried in hot water and filtered three times. The filtrates are concentrated to a volume of 200 ml. and acidified with 17 ml. of concentrated hydrochloric acid. The liquid is then evaporated, and the resulting dicarboxylic acid precipitate is then pyrolyzed in a short-path distillation unit at 200–250° C. at 5 mm. Hg pressure to obtain substantially pure 5,6,7,8-tetrahydroquinoxaline.

The aroma of the tetrahydroquinoxaline as perceived from a blotter strip dipped in its alcoholic solution is oil-fried corn chip fragrance with a potato chip character at the 0.1% level and an earthy popcorn character at the 1.0% level.

The odor of a 1 p.p.m. solution in water is like fried corn chips, and the taste is like corn chips with a light aftertaste, somewhat reminiscent also of a peanut flavor. At 0.2 p.p.m. in water there is a sweet taste with a light bitter aftertaste. The taste at 0.2 p.p.m. in a 10% aqueous sugar solution is like that of fresh milk with sweet milk chocolate, popcorn, peanut butter, earthy, and coconut flavor notes.

Tested in beef broth at 4 p.p.m., the tetrahydroquinoxaline seems to deepen the spice notes and enhances this aspect of the flavor. At 0.5 p.p.m. in chicken broth, the compound adds burning spice notes. Such characteristics fit it for a wide variety of uses as a flavor enhancer and for milk, cream, popcorn, fried corn chips, peanut, hazelnut, chocolate, and coconut flavors and aromas.

EXAMPLE III

Preparation of 2,3-dimethyl-5,6,7,8-tetrahydroquinoxaline

A three-liter Morton flask equipped with agitator, thermometer, condenser, addition funnel, gas dispersion tube, and cooling means is charged with 57.0 g. (0.5 mol) of 1,2-diaminocyclohexane in 1700 cc. of ethanol and cooled to −20° C. During a 20-minute period a solution of 43.0 g. (0.5 mol) of 2,3-butanedione in 100 cc. of ethanol is added, the flask contents turning milky-white upon such addition. The flask contents are then stirred for 45 minutes at −20° C.

After this additional stirring is completed, 20.0 g. of potassium hydroxide is added, and oxygen is sparged through the mixture for one hour at −20° C. The sparging is continued for 45 minutes as the temperature is permitted to rise to 0° C., whereupon the solution assumes a light brown color, and then for 50 minutes at 40° C. The ethanol is then removed from the clear, dark brown solution under reduced pressure.

The residue after the described ethanol removal is poured into 750 cc. of water and extracted thrice with 250 cc. portions of hexane. The hexane extracts are washed twice with equal volumes of saturated aqueous sodium chloride and dried over magnesium sulfate, and the hexane is recovered under reduced pressure. The 56.1 g. of material so obtained is distilled in a Vigreaux column with no reflux to obtain 26.1 g. of a fraction at a pot temperature of 85° C. and a vapor temperature of 75° C. at a pressure of 0.35 mm. Hg.

The aforesaid fraction in the amount of 7.4 g. (0.045 mol) is refluxed with 5.0 g. of potassium hydroxide in 200 cc. of ethanol. The ethanol is then evaporated, and the residue is taken up in ethyl ether. The potassium hydroxide is filtered off, and the crude material is chromatographed on 250 g. of aluminum oxide (acid). The column is eluted with 250 cc. of hexane and with 500 cc. of 40% ether-60% hexane to provide 3.5 g. of material.

The 3.5 g. is rechromatographed on 100 g. of aluminum oxide (acid). Elution with 150 cc. of hexane provides no material. Subsequent elution with 500 cc. of 40% ether-60% hexane provides 1.76 g. of 2,3-dimethyl-5,6,7,8-tetrahydroquinoxaline. This material is a colorless crystalline solid having a tobacco-honey odor and a melting range of 52.2–55.8° C. The structure is confirmed by IR, PMR, and mass spectroscopy.

Other 2,3-dialkyltetrahydroquinoxalines or 2-alkyltetrahydroquinoxalines can conveniently be similarly prepared by utilizing respectively 1,2-dialkyl glyoxals or 1-alkylglyoxals instead of 2,3-butadione.

EXAMPLE IV

Preparation of 5,6,7,8-tetrahydroquinoxaline

A 250 ml. flask equipped with a thermometer, magnetic stirrer, condenser, and addition funnel is charged with 7.2 g. of ethylene diamine and 175 ml. of diethyl ether and cooled to −50° C. Then 13.2 g. of 2-chloro cyclohexanone in 10 ml. ether is added during 15 minutes with agitation, and the flask contents are stirred for an additional two hours. Fourteen grams of potassium hydroxide is added and the flask contents are warmed to 3° C.

Air, dried by passage through sulfuric acid, is passed through the reaction mixture for 2.5 hours at 3° C. The reaction mixture is then heated under reflux for an additional one hour and 10 minutes and finally cooled. The course of the oxidation is followed by the gas chromatographic analysis of samples withdrawn from the reaction mixture at various time intervals.

After standing, the reaction mixture is filtered to remove solids and the ether vehicle is stripped off to leave a solid which is distilled under high vacuum using a short path distillation column: The material obtained at 85° C. and 1 mm. Hg is further fractionated by gas chromatography to yield pure 5,6,7,8-tetrahydroquinoxaline.

EXAMPLE V

Preparation of 5,7,7-trimethyl-5,6,7,8-tetrahydro-quinoxaline

A mixture of 6 g. (0.1 mol) of ethylenediamine, 15.4 g. (0.1 mol) of 2-hydroxy-3,5,5-trimethyl-2-cyclohexene-1-one, 1 g. of p-toluenesulfonic acid, and one liter of benzene is refluxed for five hours in a three-liter flask fitted with a Bidwell-Sterling distillation receiver. During the refluxing, 3.5 ml. of water is collected.

After refluxing is completed, the solvent is stripped off, and the residue is dissolved in 300 ml. of ethanol. The alcoholic solution is saturated with oxygen for one hour at −20° C., sparged with oxygen for one hour at 40–48° C., and cooled; and the alcohol is stripped off. The residue after stripping is mixed with 5 g. of petroleum oil and vacuum-distilled.

The trimethyltetrahydroquinoxaline is obtained as a liquid having a boiling point of 105° C. at 1.6 mm. Hg and the structure:

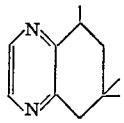

This material at the 0.6 p.p.m. level in water has a woody, fruity character; at 1 p.p.m., a nougat, honeylike character; and at 2 p.p.m. a honey, nougat character with a burning taste. The material is particularly interesting for use in honey, tea, nougat, and berry flavors, and is useful in tobacco flavoring compositions.

EXAMPLE VI

Preparation of pyrazino-[b]-cyclodecane

Ten grams (0.06 mol) of 1,2-cyclodecadione is refluxed with 4 g. of ethylene diamine, one liter of benzene, and 1 g. of p-toluene sulfonic acid for 2.5 hours. The water formed during the reaction is trapped out, and 2.3 ml. is collected. During the refluxing the deep yellow color changes to a light orange color.

The reaction mixture is then cooled, and the benzene is stripped off. Ten grams of the product is dissolved in 300 ml. of ethanol and 4 g. of potassium hydroxide is added. The mixture is cooled to −20° C., and oxygen is passed vigorously through the solution for one hour. The mixture is then warmed to 50° C. and oxygen sparging is continued for one hour. The mixture is thereupon cooled, the ethanol is stripped off, and the residue is mixed with "Primol" petroleum oil and distilled under vacuum.

The pyrazino[b]cyclodecane is obtained as a yellow liquid having a boiling point of 110–112° C. at 0.6 mm. Hg and the structural formula

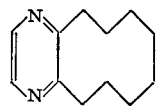

This has a taste at 1 p.p.m. in water of fat-fried onion; at 10 p.p.m. a fat-fried aroma with aftertaste of fresh onion; and at 20 p.p.m. a green vegetable aroma with a fried fat aftertaste. It can be used to provide cereal and heated butter flavor character to consumable products.

EXAMPLE VII

Cheddar cheese flavor formulation

A cheddar cheese flavoring formulation is prepared by admixing the following ingredients in the amounts indicated:

| Ingredient: | Amount (parts) |
|---|---|
| Methyl hexyl ketone | 2 |
| Diacetyl | 10 |
| Isovaleric acid | 50 |
| Hexanoic acid | 200 |
| Butyric acid | 250 |
| Caprylic acid | 600 |
| Tetrahydroquinoxaline produced in Example I | 5 |

The foregoing cheese formula is incorporated into a bland cream cheese and, when tested on crackers, is found to have an excellent, sharp cheddar cheese flavor.

EXAMPLE VIII

Beef soup

The following beef soup-flavoring composition is prepared:

| Ingredient: | Amount (parts) |
|---|---|
| Salt | 33.00 |
| Hydrolyzed vegetable protein | 23.94 |
| Monosodium glutamate | 14.63 |
| Sucrose | 13.33 |
| Autolyzed yeast powder | 4.00 |
| Onion powder | 6.00 |
| Beef extract flavor [1] | |
| Caramel color powder | 2.00 |
| Celery seed powder | 0.27 |
| White pepper powder | 0.13 |

[1] Example XVI of U.S. Patent 3,394,016.

Five ounces of the foregoing mix is added to 8 ounces of boiling water to produce a soup with a beef flavor. This preparation is repeated with a second five-ounce portion in 8 ounces of boiling water to which is added 10 p.p.m. of the tetrahydroquinoxaline prepared in Example II. The second preparation containing the tetrahydroquinoxaline is judged to have an improved flavor and aroma with more roast beef flavor character.

EXAMPLE IX

A beef-flavored gravy is prepared by combining the following materials:

| Ingredient: | Amount (parts) |
|---|---|
| Water | 350 |
| Non-fat milk solids | 20 |
| All-purpose flour | 16 |
| Lard | 13 |
| Pregelatinized starch | 8 |
| Margarine | 5 |
| Bacon fat | 5 |
| Salt | 3 |
| Monosodium glutamate | 3 |
| Sucrose | 2 |
| Hydrolyzed vegetable protein | 1 |
| Beef extract flavor (per Example VIII) | 1.6 |
| Caramel color powder | 0.05 |

The foregoing ingredients are homogenized and then autoclaved and a beef gravy is obtained. When 10 p.p.m. of the quinoxaline of Example II is added, a more pronounced beef flavor character is obtained.

EXAMPLE X

A confection center is prepared from the following ingredients:

| Ingredient: | Amount (parts) |
|---|---|
| Peanut butter | 300 |
| Ground sweet cracker meal | 100 |
| Confectioners sugar | 200 |
| Shortening | 25 |

When 5 p.p.m. of the quinoxaline of Example II is added to the confectionary center composition, a fuller richer flavor character is obtained.

EXAMPLE XI

A commercially available peanut butter is modified to contain 5 p.p.m. of the tetrahydroquinoxaline produced according to the present invention, and the modified peanut butter is tested against the unmodified peanut butter (that is, the peanut butter without added quinoxaline).

In panel comparisons of unmodified commercial peanut butter with the modified peanut butter, the modified peanut butter is consistently selected as having a greater peanut butter aroma intensity and a greater peanut taste intensity, with a significance factor of at least 95% as calculated by chi-square probability.

EXAMPLE XII

Bacon-flavor powder

A material useful for providing a bacon flavor to foodstuffs is prepared by admixing the following ingredients:

| Ingredient: | Amount (parts) |
|---|---|
| Salt | 45 |
| Hickory smoke flavor | 5 |
| Furfural | 0.1 |
| Guiacol | 0.1 |
| Isoeugenol | 0.1 |
| Ethanol | 0.1 |
| Pelargonic acid | 0.1 |
| Oleic acid | 1.0 |
| Gum arabic | 8 |
| Water | 20 |

After the foregoing mixture is prepared 10 p.p.m. of 5,6,7,8-tetrahydroquinoxaline is added, and the mixture is spray-dried in a Bowen spray-drier. The tetrahydroquinoxaline is described as imparting a nut-like flavor note to the bacon flavor.

What is claimed is:

1. A process for altering the flavor or aroma of a consumable material which comprises adding thereto a small but effective amount of at least one bicyclic pyrazine of the formula

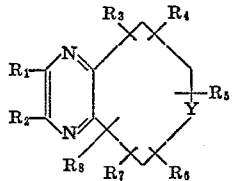

wherein Y is $(-CH_2-)_n$; $n$ is an integer from 1 to 5, inclusive, and $R_1$, $R_2$, $R_3$, $R_4$, $R_5$, $R_6$, $R_7$ and $R_8$ are the same or different and represent hydrogen or lower alkyl having one to three carbon atoms, wherein the bicyclic pyrazine is not monomethyl substituted.

2. A process as defined in claim 1, wherein $n$ is 1 and $R_1$, $R_2$, $R_3$, $R_4$, $R_5$, $R_6$, $R_7$, and $R_8$ are hydrogen.

3. A process as defined in claim 1, wherein $n$ is 1, $R_1$ $R_2$ are methyl, and $R_3$, $R_4$, $R_5$, $R_6$, $R_7$ and $R_8$ are hydrogen.

4. A process as defined in claim 1 wherein $n$ is 1, $R_4$ and $R_5$ are methyl, $R_6$ is methyl, and $R_1$, $R_2$, $R_3$, $R_7$ and $R_8$ are hydrogen.

5. A process as defined in claim 1 wherein $n$ is 5 and each of $R_1$ through $R_8$, inclusive, is hydrogen.

6. A flavoring composition comprising at least one bicyclic pyrazine of the formula set forth in claim 1 and an auxiliary flavoring adjuvant.

References Cited

FOREIGN PATENTS

| 1,156,484 | 6/1969 | Great Britain. |
| 6812899 | 3/1969 | Netherlands. |

OTHER REFERENCES

De Groot, Chemical Abstracts, 70:28890j (1969).

Testa, Chemical Abstracts, 65:2646(a) (1966).

Sax, "Dangerous Properties of Industrial Materials," 3rd ed., Reinhold Book Corp., New York (1969), p. 934.

Condensed Chemical Dictionary, 8th ed., Van Nostrand, Reinhold Co., New York (1971), pp. 619 and 622.

Henderson et al., "Noxious Gasses," Chemical Catalog Co., Inc., New York (1927), pp. 134–136.

MORRIS O. WOLK, Primary Examiner

S. MARANTZ, Assistant Examiner

U.S. Cl. X.R.

131—17, 144; 260—250 R

UNITED STATES PATENT OFFICE
CERTIFICATE OF CORRECTION

IFF 2141A

Patent No. 3,748,145  Dated July 24, 1973

Inventor(s) ALAN O. PITTET, MICHAEL E. MASON, ERNST T. THEIMER and MERRICK S. TIBBETTS It is certified that error appears in the above-identified patent and that said Letters Patent are hereby corrected as shown below:

Col. 1, lines 20-28, in the structural formula, the radical "-R" directly above "Y" in said formula should read -- $-R_5$ --.

Col. 4, line 54, change "prepared" to --preferred--.

Col. 6, line 38, correct the spelling of "are".

Signed and sealed this 18th day of December 1973.

(SEAL)
Attest:

EDWARD M. FLETCHER, JR.
Attesting Officer

RENE D. TEGTMEYER
Acting Commissioner of Patents